United States Patent

Harper

Patent Number: 5,720,491
Date of Patent: Feb. 24, 1998

[54] LIGHT-WEIGHT CYCLE SUSPENSION

[76] Inventor: Bruce M. Harper, 207 Stillwater La., San Jose, Calif. 95139

[21] Appl. No.: 620,554

[22] Filed: Mar. 25, 1996

[51] Int. Cl.[6] .................................................. B62K 3/00
[52] U.S. Cl. ........................... 280/277; 280/286; 280/276; 280/285
[58] Field of Search ................................. 280/277, 286, 280/276, 275, 283, 285, 688, 690, 660

[56] References Cited

U.S. PATENT DOCUMENTS

| | | | |
|---|---|---|---|
| 4,180,280 | 12/1979 | Doveri | 280/277 |
| 4,184,695 | 1/1980 | Roe et al. | 280/277 |
| 4,526,249 | 7/1985 | Parker | 180/219 |
| 4,782,908 | 11/1988 | Trema | 180/227 |
| 4,889,205 | 12/1989 | Yoshimi | 180/227 |
| 5,042,609 | 8/1991 | Krispler et al. | 280/275 |
| 5,299,820 | 4/1994 | Lawwill | 280/277 |
| 5,405,159 | 4/1995 | Klein et al. | 280/283 |
| 5,409,249 | 4/1995 | Busby | 280/284 |
| 5,413,368 | 5/1995 | Pong | 280/277 |
| 5,417,305 | 5/1995 | Parker | 180/219 |

FOREIGN PATENT DOCUMENTS

| | | | |
|---|---|---|---|
| 1145068 | 10/1957 | France | 280/277 |
| 520351 | 3/1955 | Italy | 280/277 |

OTHER PUBLICATIONS

"Motorcycle Engineering" by P.E. Irving; Temple Press Books Mar. 1964 pp. 17–61 (non–inclusive).
"Cycle World Technical Manual" by Gordon H. Jennings; Parkhurst Pub. Co. May 1964; pp. 52–58 Frame & Suspension.

*Primary Examiner*—Christopher P. Ellis

[57] ABSTRACT

This invention provides a low mass wheel support means for bicycles and motorcycles which maintains motion of the wheel in a constant plane relative to the support frame, without rigid constraint of the axle, in as much as the axle is free to rotate about its own center and equally transfer the displacement of one axle end to the opposite axle end.

18 Claims, 2 Drawing Sheets

LIGHT-WEIGHT CYCLE SUSPENSION

FIELD OF THE INVENTION

The present invention relates to improvements in suspension systems for bicycles and motorcycles and other single-tracked vehicles.

BACKGROUND OF THE INVENTION—PRIOR ART

Epic proportions of work have gone into the design and development of safe, comfortable vehicle suspension systems over the last 110 years. Motorcycles and bicycles have utilized a wide variety of suspension schemes in attempts to achieve this elusive goal. In addition to comfort, a good suspension system is also essential for safe and accurate handling of any vehicle, but particularly so for single tracked vehicles such as motorcycles and bicycles since they are by nature, inherently unstable. Stability is achieved only in motion due to the physics of the vehicle geometry. Most of this stability results from the corrective actions of the suspension system wheel geometry including the effects of castor and road undulation shock accommodation and traction. Obviously, the wheel suspension geometry can only be effective in correcting directional transgressions of the cycle when and only when the wheel is in contact with the ground. An airborne wheel is unable to correct the balance or direction of a cycle. In order for a wheel and suspension system to have fast and supple compliance capabilities allowing it to conform to road undulations, the mass of the wheel and suspension system has to be as low as possible. It is easy to envision a zero mass suspension system as having absolute road compliance following every bump and variation without ever separating from the road. Such an idealized suspension would have no unsprung mass beyond the wheel axle. With such a system absolute control could be attained. While this goal is, in reality, unattainable since some unsprung wheel supporting structural mass is required, it is obvious that every possible effort has to be made to minimize the unsprung mass of the wheel and suspension assembly to come as close as possible to this ultimate goal.

In pursuit of achieving an optimal suspension design, heavily compromised success has been found through the use of a variety of suspensions including: short leading links, long leading links, swing arms, plunger suspension, sprung hubs, trailing links, girder forks with four-bar link control and articulated frame members. U.S. Pat. No. 5,417,305 to Parker and U.S. Pat. No. 5,409,249 to Busby aptly illustrate the extent to which respective front and rear suspension systems have evolved. In addition to adding complexity, these systems increase total weight and unsprung weight. The optimum goal in suspension design is to achieve the greatest rigidity of controlled motion (i.e. limiting the wheel to motion within a single plane corresponding to the vertical plane of the cycle chassis) while obtaining the lowest unsprung weight (i.e. that weight which moves in unison with the wheel axle). A rigid, stable suspension system creates predictable, repeatable performance of the wheel action, whereas, a low unsprung weight allows the wheel to follow surface undulations and stay in contact with the ground for a longer period of time thus providing greater control.

As applied to the front end of a cycle, by far, the most popular suspension system in use today involves a pair of telescoping cylinders commonly known as telescopic forks, which utilize either a coaxial internal or external spring for suspending the vehicle loads. In certain applications (especially motorcycles) a damping means is also present to minimize spring oscillation. The system generally comprises a pair of massive, sturdy tubes rigidly fastened to a pivotal steering fixture and extending downward towards the axis of the wheel. Attached to these fixed tubes are a pair of axially coincident tubes which are closely fitted, by means of a sliding sleeve bearing, either over the outside or the inside of the fixed tube thus providing a telescoping motion. The sliding and the fixed tubes are further connected, and their relative motion limited, by a spring (usually compression) fastened to each tube. Additionally, some form of shock absorber such as a frictional or fluidic dampener is incorporated inside the tube assembly and similarly anchored at each end to each of the tubes.

Unfortunately, this suspension system is far from ideal for the following reasons:

a) The moving ends of the tubes generally attach at the wheel axle in such a way that the axle is very rigidly clamped to the end of each tube, with the wheel being rotateably mounted to the clamped axle by means of a pair of bearings. It is required that the axle be robustly attached to the two tubes in order to maintain stability of the wheel/axle assembly preventing wheel skewness and variations relative to the optimal suspension plane of operation. Rigid axle mounting is also required to insure that the sliding bearings of the suspension tubes move in unison to prevent binding of the otherwise independent bearings on the two support tubes. The consequence of trying to achieve uniform motion and rigidity of the two suspension elements is significantly increased weight due to the massive clamping and joining elements required to hold such a system together. Even then, a very rigid axle mounting is sometimes unable to provide uniform motion for the two sliding suspension tubes in rough sports applications such as off-the-road riding. Indeed, an additional brace is usually added which connects the tops of the sliding tubes with a bridge of metal arcing over the cycle tire. As a consequence, even more mass is added to the unsprung weight.

b) Another design prerequisite of the sliding, telescoping tube design is that the sliding sleeve bearings be relatively long as compared to their diameter. It is a general rule of thumb that an axially sliding bearing needs to be at least three times as long as its diameter in order to be free from binding. Due to the extreme forces imposed on motorcycle suspensions, this length-to-diameter ratio is usually substantially greater than 3:1. While this provides improved bearing performance, the increased bearing length also creates a larger bearing housing assembly and thus, once again, more weight. This added weight is more unsprung mass which counters the ability of the wheel to quickly follow the contours of the terrain over which it is riding.

c) Unfortunately, there is an additional binding load imposed on the sliding tube bearings when a harsh bump is met or the brakes are applied since the bearings are well above the point of force application (axle). These loads create a binding moment which further increases bearing frictional load.

d) In addition, the increased bearing surface area which is covered with a lubricant, creates additional viscous drag in proportion to the increased surface area further impeding the suspension response to variable terrain. This viscous drag can be substantial, particularly when cold. It can also be undesirably variable in response to external changes in weather temperature and internal frictional heating.

e) Proper functioning of the twin tube telescoping suspension system is further challenged by the springing and dampening elements of the design. It is required that a pair of closely matched springs and matched shock absorbers are attached to each sliding tube. Should one of the springs be of a different length, a different wire size or spring temper, or even break prematurely, a differential force will be exhibited on one of the sliding tubes thus causing failure due to binding and wheel skewness. In a like fashion, when one of the two shock absorbers changes its dampening action due to fluid loss, increased internal binding, check valve failure, differential fluid heating or the like, it will also bias the force applied to one of the tubes creating reactions similar to the differential spring force noted above.

f) Similar limitations also affect the rear suspension systems of bicycles and motorcycles. Most of these schemes utilize some form of swing arm whereby the rear wheel axle is rigidly affixed to a pair of struts connected in a "U" shaped configuration which extend forward in a substantially horizontal fashion and are pivotally secured to the frame usually ahead of the tire. The wheel/swing arm structure motion is further constrained by some sort of spring suspension and shock absorbing means. In its simplest form the shock absorbers, with integral springs, are fixed at one end to the frame somewhere above the swing arm plane and fastened at the other end to the swing arm itself, generally near the wheel axle. Later designs use a swing arm which has a short bellcrank firmly attached at the pivot end of the swing arms which connect, in turn, to a combination shock absorber/spring suspension assembly. This assembly is finally terminated to a very robust frame lug plate. As can be seen, these systems get quite complex and heavy. But, without these sturdy, massive components, the rear wheel could be allowed to flex, thus actually steering the cycle in a manner adverse to the driver's wishes. Typically, if bicycles have any rear suspension at all, they are modeled after motorcycle practice where weight and complexity are accepted elements of traditional suspension. Bicycles are particularly sensitive to the suspension paradox of needing rigidity for steady, predictable handling yet needing light weight for efficient power use and quick response to bumps and road hazards. Also, since every ounce of weight has to be propelled by muscle energy, low weight is particularly important to the bicyclist propelling all this mass up a hill.

As can be appreciated by the above descriptions, all of these suspension schemes depend on rather massive structures for stiffness and a solid clamping of the wheel axles to attain planar motion stability of the total moving suspension structure. Accordingly, it can be seen that the unsprung masses of these systems is also high which counters good suspension compliance capability.

SUMMARY OF OBJECTS AND ADVANTAGES

Accordingly, it is an object of this invention to minimize the unsprung mass of the suspension system and provide the transfer of a displacement of one end of the wheel axle equal to the displacement of the other end:

a) a further related object is to provide a suspension system with a minimum number of moving parts and the fewest total parts.

b) An additional object of this invention is to minimize the sliding bearing area thus minimizing viscous lubricant drag of the bearings.

c) It is a further object of the invention to maintain axle squareness relative to the plane of the cycle frame without resorting to long aspect ratio sliding bearings.

d) A related object of the invention is to provide the ability of having a single spring/shock absorber on one side of the suspension without sacrificing axle squareness.

e) Yet another object is to allow a variable axle path suspension that need not conform to a straight line or a fixed radius motion path.

f) still another benefit of this invention is that precise motion control is attained without resorting to precision manufactured components.

g) an added object is the placement of the suspension bearings in close proximity to the wheel axle minimizing any binding moment on the bearing due to road forces and braking. Supplementary objects and advantages will become apparent during consideration of the ensuing description and drawings.

Figure 1:
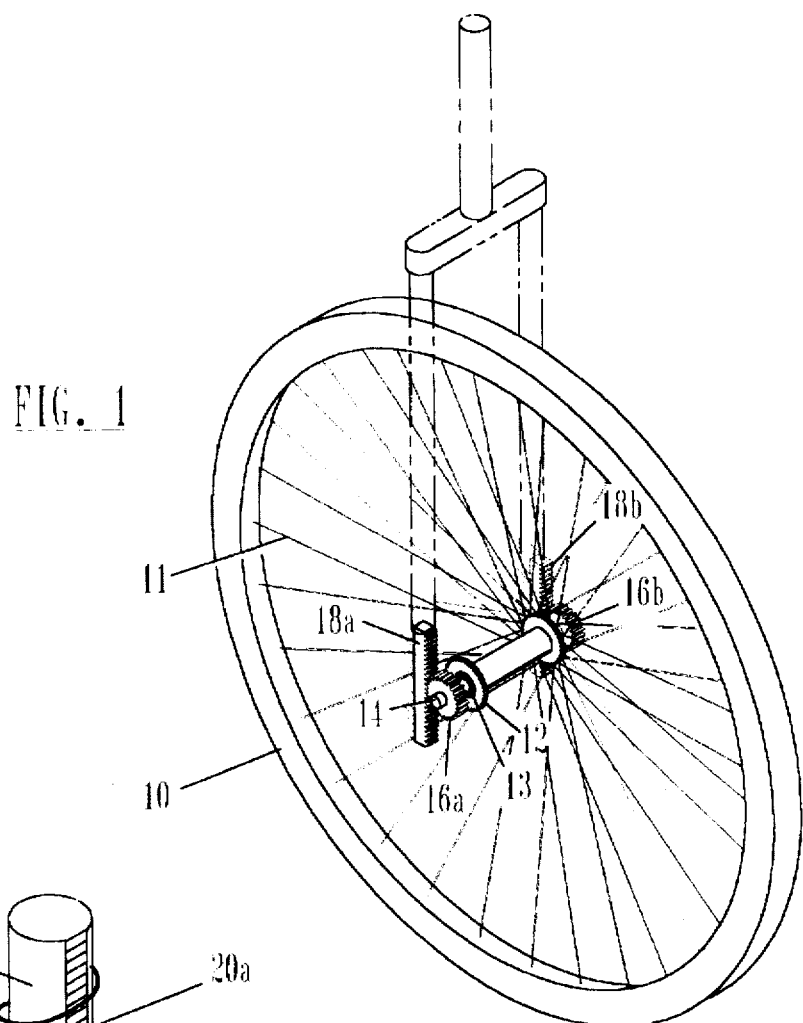
FIG. 1 shows a suspension and wheel assembly in elemental form, with the nearside spokes removed for clarity, and a pair of parallel spaced rack gears, secured to a common solid frame extension reference as indicated by grounding symbolism, in mesh with gear pinions securely fastened to each end of an axle supporting a wheel and hub assembly with integral bearings.

| Reference Numerals for Drawings | |
|---|---|
| 10 | Wheel rim and tire |
| 11 | Spokes |
| 12 | Hub |
| 13 | Bearings, wheel hub |
| 14 | Axle, wheel |
| 16 | a & b; Pinion gear, wheel axle |
| 18 | a & b; Rack gear |
| 20 | Rack gear, tube with cut |
| 22 | Bearing housing |
| 24 | Bearing, linear |
| 26 | Bearing, rotational |
| 28 | Gear sector, arced |
| 29 | Cycle frame member |
| 30 | Swing arm |
| 31 | Body, sector gear |
| 32 | Pin, pivot |
| 33 | Bearing, pivot |
| 34 | Bearing, rotational |
| 35 | Axle, wheel |
| 36 | Gear, pinion |
| 37 | Hub, wheel |
| 38 | Spring |
| 39 | Rim, wheel |
| 40 | Serpentine guide |
| 42 | Serpentine rack gear |

| | -continued |
|---|---|
| Reference Numerals for Drawings | |
| 44 | Pinion, axle |
| 46 | Axle |
| 48 | Yoke, Connecting |
| 50 | Guide roller |

DETAILED DESCRIPTION

FIG. 1 is an illustration of the basic invention concept. The wheel rim and tire 10 is connected to a wheel hub 12 by spokes 11 or other conventional means, all of which rotatably mount as a unit about axle 14 through bearings 13 integral to the hub 12. The axle 14 has two gear pinions 16a and 16b solidly fixed to each end of the axle 14 producing a single revolving unit. A pair of rack gears 18a and 18b are similarly meshed with pinions 16a and 16b respectively and held in a fixed relationship of one rack relative to the other rack. Racks 18 are further attached to the cycle frame (shown in phantom and grounding symbol).

Figure 2:
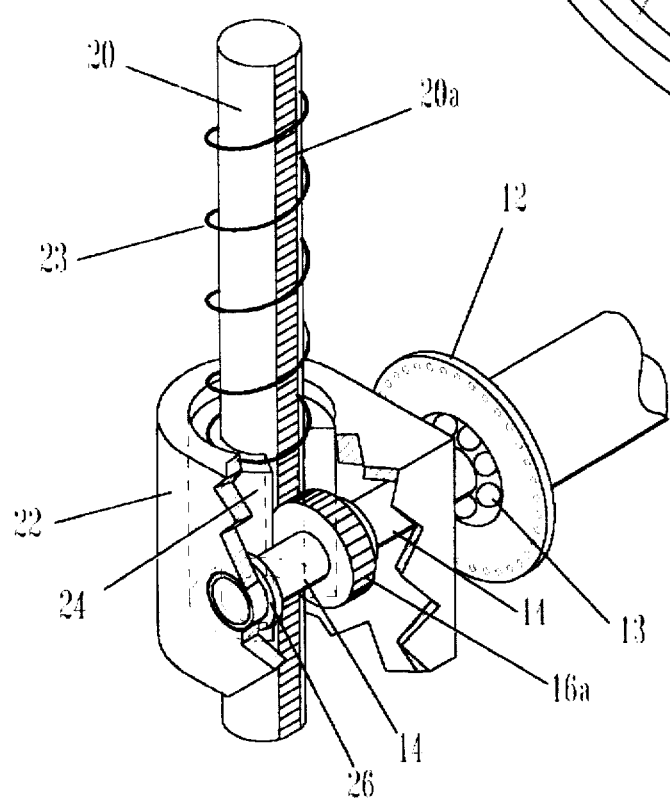
FIG. 2 shows extended details of one side of the invention of FIG. 1 above, including a housing, a rotational bearing, a linear bearing, a combination guide cylinder and rack gear, an axle with affixed pinion gear and a support spring.

FIG. 2 is a detailed perspective of one side of the geared suspension system of FIG. 1, illustrating additional cooperating elements as might be used in a fully functional system. The rack gear 20a is shown as cut into a cylindrical shaft 20 over which slides a bearing housing 22. Housing 22 contains a linear motion bearing 24 which envelopes a portion of shaft 20, and a rotational motion bearing 26 which supports the axle 14 and affixed pinion gear 16a in a manner perpendicular to cylindrical shaft 20. The bearings 24 and 26 are positioned to maintain proper pitch circle engagement of the rack gear 20a and the axle pinion 16a. Housing assembly 22 is free to slide along shaft 20. Coil spring 23 is shown loosely encircling the rack-gear shaft 20 with one end attached to housing 22 and the other end of the spring 23 is affixed to cylindrical shaft 20.

Figure 3:
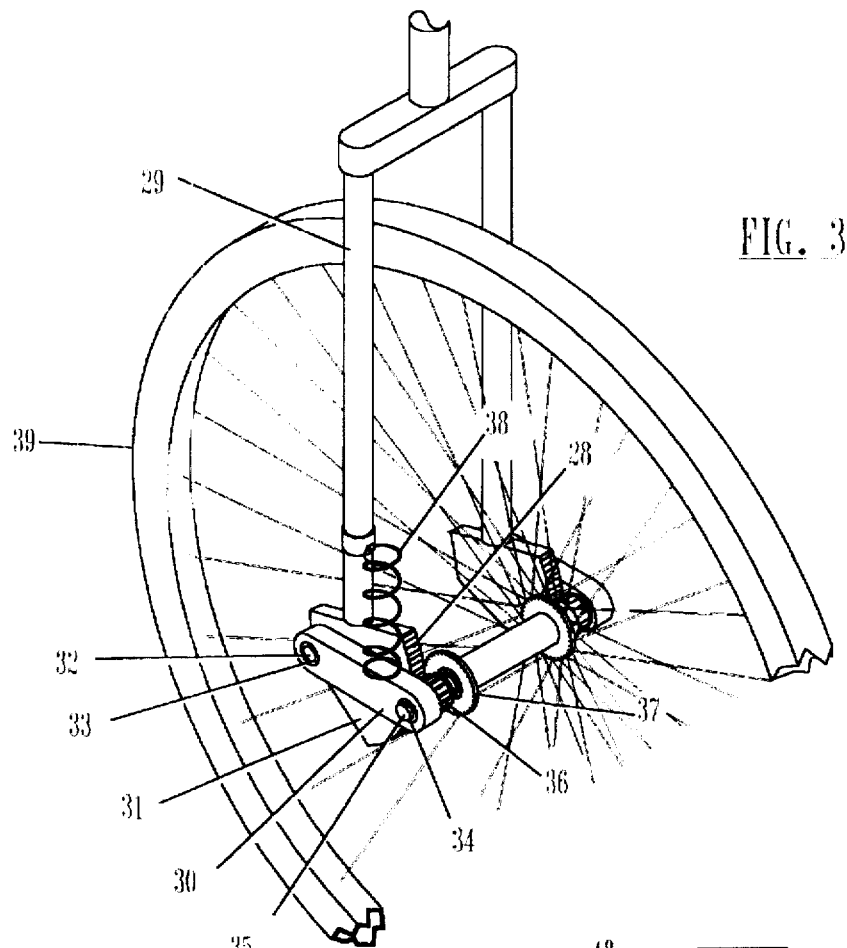
FIG. 3 illustrates a pivoting arm with an axle/gear assembly in mesh with a constant radius gear sector, once again with the nearside spokes removed for clarity.

FIG. 3 shows a configuration in which the rack gear is a circular section such that the wheel axle with attached pinion gear, follows the arc of the gear as dictated by means of accompanying swing arms. Arced gear sector 28 is immovably fastened to cycle frame member 29 through body 31. Swing arm 30 is pivotally mounted to pin 32 which is attached to sector gear body 31. The moving end of swing arm 30 encompasses a rotational bearing 34 which in turn supports wheel axle 35 with its affixed pinion gear 36. Pivot bearing 33 is spaced a constant distance from axle support bearing 34 by swing arm 30 such that pinion gear 36 is in constant mesh with arced gear sector 28.

Figure 4:
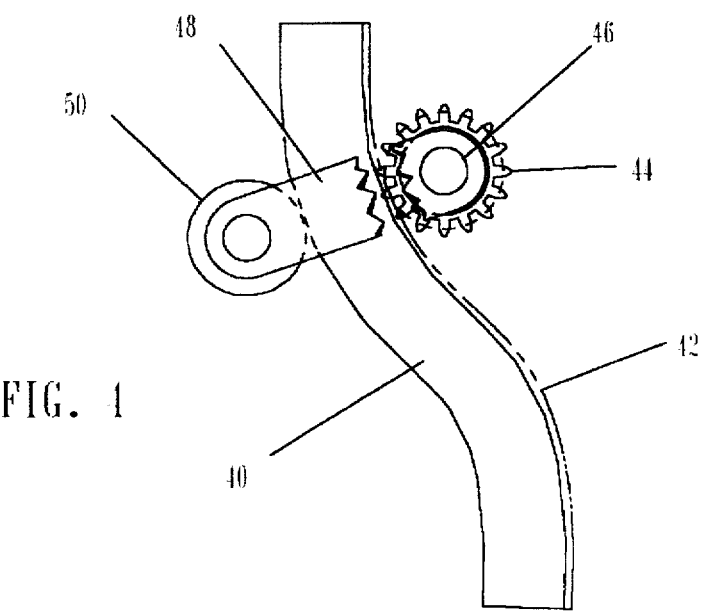
FIG. 4 shows a configuration of the rack gear as serpentine in shape with a yoked bearing assembly maintaining engagement of the axle gear.

FIG. 4 shows a configuration of the invention whereby the wheel axle follows a prescribed serpentine path as it translates under load. Rack gear 42 is formed into the serpentine shape of support rod 40 to produce a specific, preferred path for the wheel axle 46 to follow as it is displaced. Axle 46 is terminated at each end with a pinion gear 44. Connecting yoke 48 rotatably supports axle 46 with a suitable bearing and similarly supports an opposed, rotatable guide bearing 50 which is in free rolling contact with the serpentine shaped support rod 40. Yoke 48 is configured to maintain pinion gear 44 in proper mesh with rack gear 42 at all locations by positioning guide bearing 50 at an appropriate distance from pinion gear 44.

OPERATION

The motion of the cycle wheel of this invention can be designed to follow a conventional path such as straight-line motion or a fixed-radius arc, or, alternatively, configured to follow a serpentine geared guide shaft that is neither fixed radius nor straight-line.

FIG. 1, illustrates the basic elements of the straight-line motion suspension configuration. It can be seen that a complete wheel assembly comprising tire and rim 10, spokes 11 and hub 12 can freely spin about axle 14 by virtue of integral hub bearings 13. It can also be seen that if the wheel assembly were to be displaced in a substantially vertical direction, such displacement would also displace the wheel axle 14 an equal amount. Without some means of stabilizing both ends of the axle, a side-force component normal to the plane of the wheel would cause the wheel to tip out of its original plane.

However, since axle 14 has matched spur gears 16a and 16b fixed to each end of axle 14 and meshed into engagement with matched rack gears 18a and 18b which are coincidentally mounted to cycle frame elements, as represented by grounding symbology, axle orientation stability, or yaw, is maintained throughout its motion along the rack gear system.

While the two racks 18a and 18b maintain a fixed, parallel, planar position relative to each other, the wheel assembly, comprising the wheel rim 10, spokes 11, hub assembly 12, and axle 14 with integral pinion gears 16a and 16b, can be made to translate along a path parallel to the rack gear plane by rolling along the rack gears. During this translation, the plane of the wheel, which is normal to the rack gear plane, remains unchanged due to the axle pinion gears 16a and 16b in meshed engagement with the rack gears 18a and 18b.

Rotational activity of axle 14 is independent of wheel 10 and hub 12 assembly rotational movement and vice versa, yet both have a coincident linear translation motion.

If a linear motion inducing force is applied to one end of the axle 14, in the direction of the rack, the translation of the axle end and its attached pinion gear would cause the gear and axle to revolve due to the meshed engagement of the rack and pinion gears. Said gear and axle rotation would cause the opposing pinion gear to likewise rotate and climb up the rack mesh in a 1:1 relationship. In this manner, the wheel is allowed to translate along the rack gear assembly within the original plane of the wheel.

FIG. 2 further shows a detailed representative operative assembly of components on one end of the axle. Housing 22 can slide along the axis of cylindrical support shaft 20 while being guided by integral linear bearing 24 which is affixed to a bore in housing 22. Housing 22 similarly contains a rotational bearing 26 which supports one end of axle 14. Shaft 20 has a rack gear 20a cut into its surface along its length which engages pinion 16a of the axle. Thus, when the axle is forced upward from a wheel force corresponding to the action of encountering a road bump, the housing 22 is forced in the same direction through a reaction force from bearing 26. This motion causes a rotational action on pinion gear 16 and a corresponding rotation to attached axle 14. The rotation of axle 14 rotates a corresponding pinion gear on the other end of axle 14, as shown in FIG. 1. Such rotation of the opposing pinion gear causes the corresponding housing on the other end of axle 14 to climb up the rack gear of the corresponding cylindrical support shaft thus maintaining axle trueness to the initial wheel plane. Housing 22 is urged into a predetermined position along shaft 20 by means of spring 23. Spring 23 has one end affixed to housing 22 and the other end affixed to shaft 20. The position and motion of housing 22, axle 14 and its related wheel assembly is determined by the force of spring 23.

Thus it can be seen that the vehicle loads are supported through the spring 23, housing 22, axle bearing 26 and axle 14 which is in turn supported by the wheel assembly.

FIG. 3 shows an embodiment of the basic concept in which the rack gear is a constant radius arc and the axle motion follows a path at a constant distance from the arced gear segment. A substantially vertical force on the wheel 39 is transferred to hub 37 which, in turn displaces axle 35. Axle 35 has rotational movement within bearing 34 which also transfers radial forces to swing arm 30. Said radial forces in a vertical direction cause swing arm 30 to pivot about pin 32 by way of rotational bearing 33. Swing arm 30 tends to be predisposed to a counterclockwise motion due to the weight loading of the cycle and any additional road undulation forces exerted on the wheel. Spring 38 exerts a force opposing this motion and achieves equilibrium. As swing arm 30 pivots, it moves pinion gear 36 through an arc maintaining engagement with sector gear 28 causing said pinion gear 36 to rotate. Rotation of this gear causes attached axle 35 to rotate a corresponding amount which in turn causes the opposite pinion gear to rotate in a like fashion engaging its own sector gear. Thus, both pinions move in unison engaged with matched gear sectors as a result of input motion from either pinion. The axle is totally supported by free pivots without the use of rigid mounting clamps, yet the wheel motion is constrained to a single plane of motion normal to the axle.

FIG. 4 shows a variable axle path configuration of the invention whereby guide rod 40 is formed into a desired shape with gear teeth 42 cut along one of the non-planar surfaces. As axle 46 is displaced essentially along the axis of guide rod 40, it is forced to follow the contours of said guide rod by means of connecting yoke 48 and guide bearing 50. The geometry of this axle support system is configured to provide a specific vehicle wheelbase relative to the degree of deflection the wheel is experiencing.

SUMMARY, RAMIFICATIONS, AND SCOPE

Accordingly, the reader can readily see that the extremely low mass of this invention offers a multitude of benefits not available to the prevailing suspension systems in use today such as improved handling, improved safety, less muscle energy required for pedaling and faster wheel response. In addition, this suspension system eliminates bearing racking and binding by insuring that both bearings always move together as a unit and that the wheel loads of the axle are applied to the closest possible proximity to the supporting bearings. Since the bearings are located right at the point of loading, smaller bearings can be used without loss of support strength. Smaller bearings mean lower viscous lubricant drag and therefor faster suspension response.

The balanced end-to-end axle support of this system also simplifies the spring support system allowing a multitude of spring types as well as accepting only one spring element which will still provide adequate vehicle support.

Although the description above contains many specificities, these should not be construed as limitations of the scope of the invention but rather as a modest presentation of a few of the potential advantages of the preferred embodiment of this invention. For instance, the energy transmitting elements at the axle ends could be envisioned to encompass flexible toothed belts, pin and peg smooth belts and wire cable as well as gears.

Thus the scope of the invention should be defined by the appended claims and their legal equivalents, rather than solely by the examples provided.

It is claimed:

1. A vehicle suspension, comprising, in combination:

a vehicle frame, a wheel adapted for rotation about an axle, rotational motion connecting elements affixed to the ends of said axle, receiving motion connecting elements affixed to said vehicle frame, movable axle supporting means connected to said receiving motion connecting elements providing axle rotation, said movable axle supporting means engagably positioning said rotational motion connecting elements and said receiving motion connecting elements, a supporting spring means connected at one end to said frame and at the other end to said movable axle supporting means, whereby rotational motion applied to one end of said axle is transmitted by torque through said axle to an opposite rotational motion connecting element and an oppositely matched receiving motion connecting element providing controlled axle translation.

2. The vehicle suspension of claim 1 wherein said receiving motion connecting means are linear shafts with affixed cogged features.

3. The vehicle suspension of claim 1 wherein said receiving motion connecting means are arc segments of constant radius with affixed cogged features.

4. The vehicle suspension of claim 1 wherein said rotational motion connection means are cogged features affixed to each end of said axle.

5. The linear shaft of claim 2 wherein the cogged features are rack gears.

6. The cogged features of claim 3 are constant radius sections of circular gears.

7. The rotational motion connection means of claim 1 are gear pinions in unit with said axle.

8. The vehicle suspension system of claim 1 whereby the supporting spring means is a helical spring.

9. The vehicle suspension of claim 1 wherein said rotational motion connection means are taut bands opposedly affixed at each end to said frame, wrapped around and tethered to, drums affixed to each end of said axle.

10. A vehicle suspension, comprising, in combination:

a vehicle frame, a wheel adapted for rotation about an axle, rotational motion connecting elements affixed to the ends of said axle, receiving motion connecting elements affixed to said vehicle frame, a movable axle supporting means connected to said receiving motion connecting elements providing axle rotation, said movable axle supporting means engagably positioning said rotational motion connecting elements and said receiving motion connecting elements, a supporting spring means connected at one end to said axle and at the other end to said movable axle supporting means, whereby rotational motion applied to one end of said axle is transmitted by torque through said axle to said opposite rotational motion connecting element and said receiving motion connecting element providing controlled axle translation.

11. The vehicle suspension system of claim 10 whereby the supporting spring means is a spiral spring affixed at one end to the end said axle and at the other end to said movable axle supporting means.

12. The vehicle suspension system of claim 10 whereby the supporting spring means is a torsion spring affixed at one end to the hollowed inside of said axle and affixed at the other end to said movable axle supporting means.

13. The vehicle suspension system of claim 1 whereby the supporting spring means is an organic elastomer.

14. The vehicle suspension system of claim 1 whereby the receiving motion connecting elements are affixed to the steerable elements of said vehicle frame.

15. The vehicle suspension system of claim 1 whereby the receiving motion connecting elements are affixed to the non-moving said vehicle frame elements.

16. The vehicle suspension system of claim 1 whereby said receiving motion connecting elements are belts affixed at each end to said vehicle frame and engagably connected to said rotational motion connecting elements.

17. The vehicle suspension system of claim 16 whereby said rotational motion connection element is a drum cirumferentially enveloped by and affixed to the central proximity of said belt.

18. A vehicle suspension, comprising, in combination:

a vehicle frame, a wheel adapted for rotation about an axle, rotational motion connecting elements affixed to the ends of said axle, serpentine configured receiving motion connecting elements affixed to said vehicle frame, a movable axle supporting means connected to said receiving motion connecting elements providing axle rotation adapted to follow said serpentine configured receiving motion element, said movable axle supporting means engagably positioning said rotational motion connecting elements and said receiving motion connecting elements throughout all serpentine positions, a supporting spring means connected at one end to said frame and at the other end to said movable axle supporting means, whereby rotational motion applied to one end of said axle is transmitted by torque through said axle to said opposite rotational motion connecting element and said receiving motion connecting element providing controlled axle translation over a predefined serpentine path.

* * * * *